Oct. 26, 1965     W. S. FIEDLER     3,214,265

METHOD OF MAKING METAL FOAM BODIES

Original Filed Aug. 11, 1960     3 Sheets-Sheet 1

INVENTOR.
WILLIAM S. FIEDLER
BY
ATTORNEY

Oct. 26, 1965 W. S. FIEDLER 3,214,265
METHOD OF MAKING METAL FOAM BODIES
Original Filed Aug. 11, 1960 3 Sheets-Sheet 2
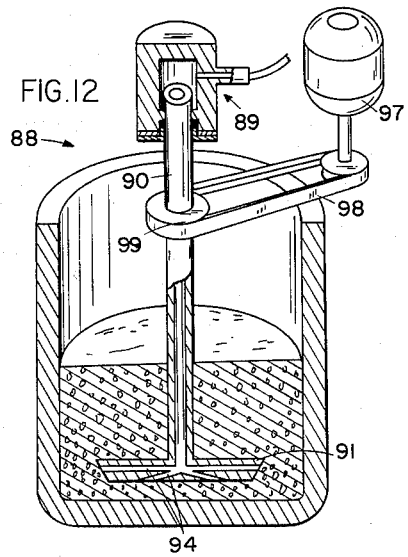
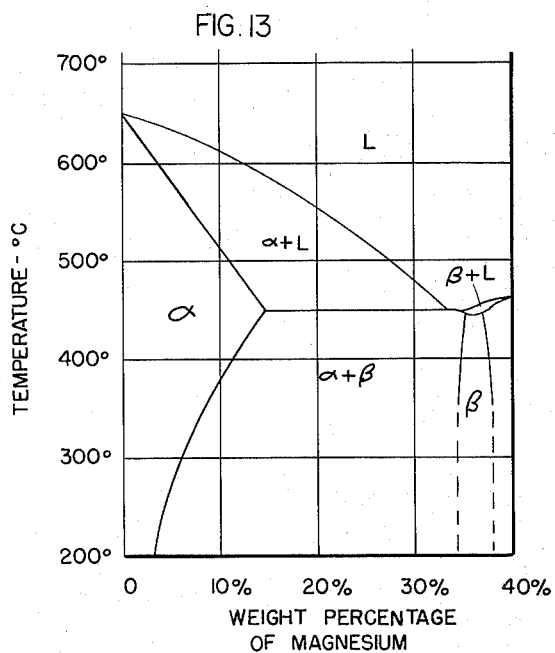
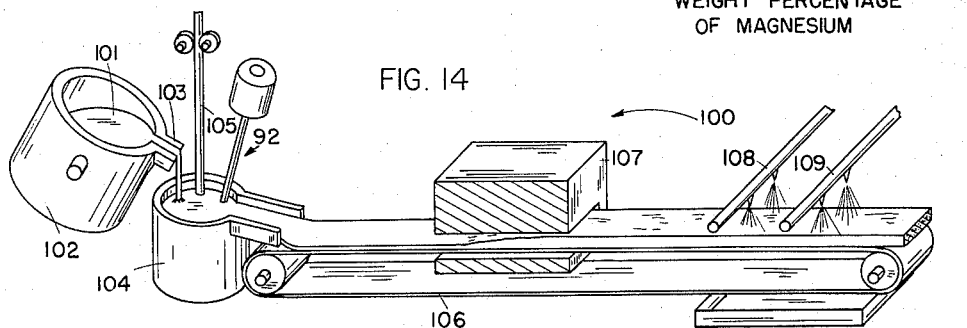
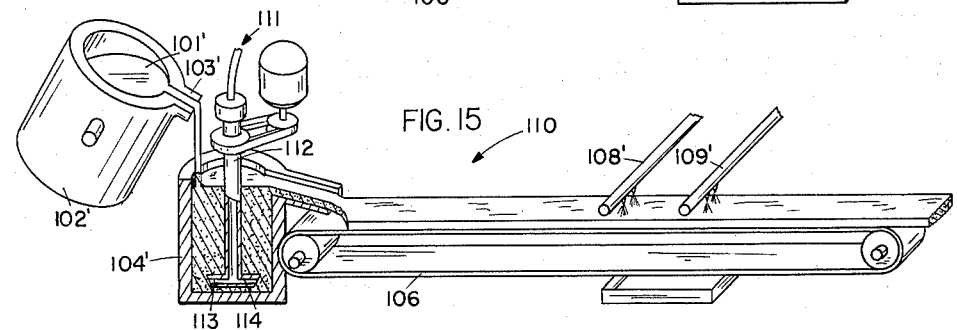
INVENTOR.
WILLIAM S. FIEDLER
BY Oct. 26, 1965　　　　W. S. FIEDLER　　　　3,214,265
METHOD OF MAKING METAL FOAM BODIES
Original Filed Aug. 11, 1960　　　　3 Sheets-Sheet 3
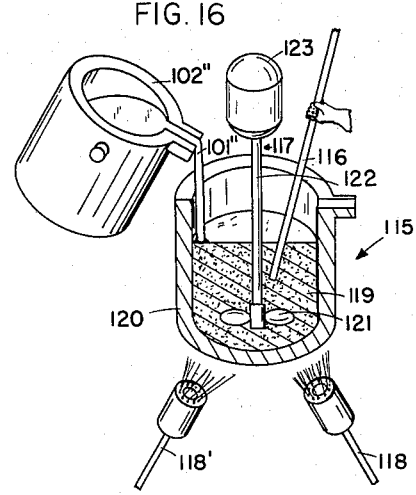
FIG. 16
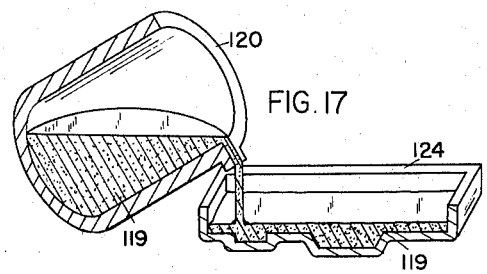
FIG. 17
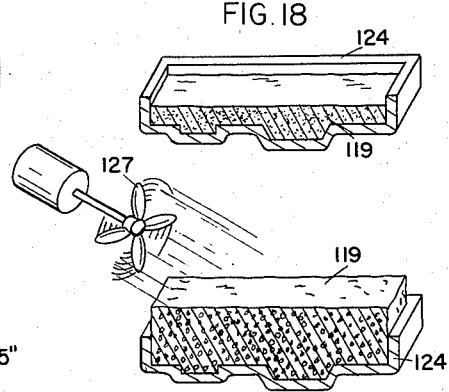
FIG. 18
FIG. 20
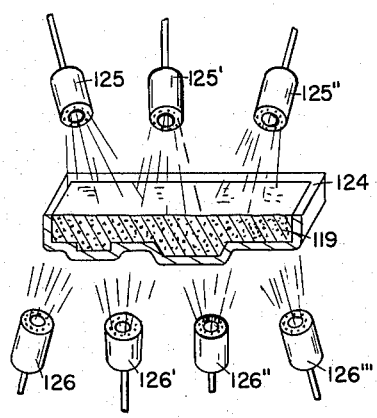
FIG. 19
INVENTOR.
WILLIAM S. FIEDLER
BY
ATTORNEY United States Patent Office 3,214,265
Patented Oct. 26, 1965

3,214,265
METHOD OF MAKING METAL FOAM BODIES
William S. Fiedler, Madison, Wis., assignor, by mesne assignments, to Lor Corporation, a corporation of Delaware
Filed Mar. 11, 1963, Ser. No. 264,438
11 Claims. (Cl. 75—20)

This application is a continuation of my continuation application Serial No. 48,956, filed August 11, 1960, now abandoned, having the same title as my application Serial No. 637,735, filed February 1, 1957, now abandoned, having the same title.

This invention relates to the manufacture of metal foam and in particular to methods and apparatus for making metal foam.

Metal foam manufactured according to the method of the invention may be utilized in a variety of applications such as, for example, a reinforcing means or support in structures having low weight requirements, a means for achieving high buoyancy without loss of rigidity and strength; a means for affording a cushioning effect for impact stresses exceeding predetermined and relatively large amounts of force; or generally, whenever the twin requirements of low weight per unit volume and exceptional rigidity and toughness preclude the use of conventional materials or as a substitute for such materials.

Heretofore, a variety of methods have been employed for producing metal foams. However, no method has been found which will give a satisfactorily uniform, low density product or a suitable process for large scale manufacture.

One method which has been proposed for making foamed aluminum is the vaporization of mercury in aluminum. This method is highly unsatisfactory since the evolution of gas is very difficult to control and the materials involved in the reaction have a deleterious effect on each other. While the mercury may volatilize to form the cells of the metal foam, it dissolves in the aluminum and causes contamination of the aluminum and collapse of the cells.

Another method proposed for a large scale manufacture involves the addition of an alloy comprising ground metal hydride directly to the surface of the metal matrix. The alloy is prepared for addition by grinding together metal hydride and one or more molten metals and then cooling and reducing the resultant product to a powder. The grinding step has heretofore been believed neccessary in forming a suitable hydride-containing alloy and the use of such an alloy, rather than unalloyed hydride, has also been believed necessary. The powder has been very difficult to add to the metal matrix to be foamed in a suitable manner to provide suitable foaming due to its buoyancy and as a result control of the density is very difficult to maintain. The hydride-containing powder tends to float to the top of the matrix and oxidize, i.e., burn or explode or both, violently.

Another method which has been applied for producing metal foam is the use of a worm feed to supply the molten metal with hydride. The metal frequently blocked up the feed apparatus and caused the production of an inferior product.

By metal "foam" I mean a body consisting of gas-containing discrete cells distributed in a metal matrix in a generally uniform manner, each cell being entirely enclosed and generally being not connected to any neighboring cell. Metal foam should not be confused with metal sponge which consists of interconnected cells or a plurality of passages or interstices which communicate in a metal matrix.

The present invention contemplates making a metal foam article which may be compared to a cake or loaf of bread by introducing a cell former which may be compared to baking powder directly without the preliminary step of commingling the "baking powder" into a "batter." It also contemplates the "baking of the cake" as a discrete second step which is initiated only after completion of the first step which comprises the addition of cell former to the molten metal and mixing of the two. In the second step the "cake" is allowed to bake at a predetermined temperature so that full rise of the metal foam is obtained. It is essential that a minimum of pressure be applied to the material both during the first or mixing step and the second or baking step, since application of pressure would adversely affect the foam. The analogy between foaming of metal and baking of bread or cake has usefulness only to a certain degree to make clear the nature of the steps involved; the baking of a dough to make bread or the like involves change of form of the dough from plastic to rigid resulting from application of heat whereas in the instant process solidification of the metal results only from withdrawing heat.

An object of the present invention is the production of a metal foam having uniform cell size and uniform dispersion of the individual cells.

Another object is the provision of a method for suitably metering and introducing into a body or stream of molten metal a suitable reactant to cause foaming of the metal matrix.

Another object is a method for making foamed metal wherein the metal to be foamed has a widely different solid phase and liquid phase temperature.

Another object is a method for foaming metal alloys wherein the alloy has a solid phase which predominates to an extent producing increased viscosity or reduced fluidity.

Another object is a method for continuously making metal foam.

Further objects will become apparent from the drawings and the following detailed description in which it is my intention to illustrate the applicability of the invention without thereby limiting its scope to less than that of all those equivalents which will be apparent to one skilled in the art except as limited by the subjoined claims.

In the drawings like reference numerals refer to like parts and:

FIGURE 12 is a cross-sectional view of a reaction vessel containing molten metal to be foamed and means for introducing gas into the molten metal;

FIGURE 13 is a phase diagram of an aluminum magnesium alloy;

FIGURE 14 is a partially cutaway perspective view of an embodiment of the invention showing a continuous process;

FIGURE 15 is a partially cutaway perspective view of another embodiment of the invention showing a continuous process;

FIGURE 16 is a vertical partially cutaway view of an embodiment of the invention showing a batch process;

FIGURE 17 is a cross-sectional view of an embodiment of the invention showing a batch process;

FIGURE 18 is a cross-sectional view of an embodiment of the invention showing a batch process;

FIGURE 19 is a side elevated view of an embodiment of the invention showing a batch process;

FIGURE 20 is a side elevational view of another embodiment of the invention showing a batch process.

Figure 1:
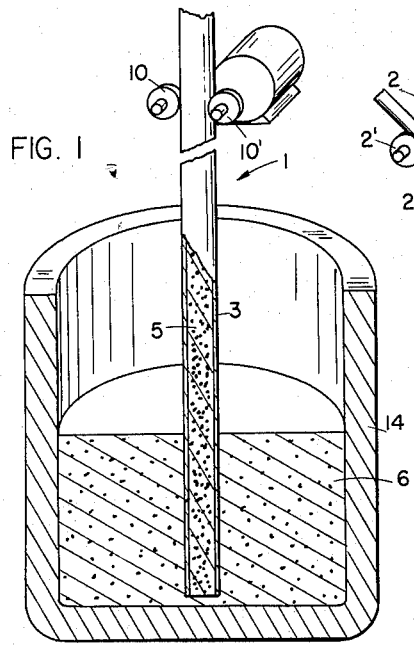
FIGURE 1 is a vertical cross-sectional view of the device for introducing a rod according to the invention into intimate reactant relationship with a molten metal.

As shown in FIGURE 1, the rod generally indicated as 1 comprising a metal tube 3 and a hydride-containing metal alloy or powder 5 may be introduced into the molten metal 6 at a controlled rate by means of feeding elements, which in this view of the invention comprise oppositely rotating rollers 10, 10' schematically illustrated. The vessel of the invention 14 may be of any material adapted to resist the heat of the metal. Preferred materials for the reaction vessel are ceramic materials such as silicon carbide or metal such as cast iron.

Figure 2:
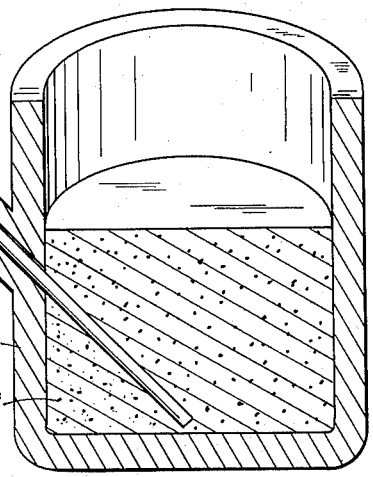
FIGURE 2 is a cross-sectional view of another embodiment of the invention for introducing a rod according to the invention into intimate reactant relationship with a molten metal.

As shown in FIGURE 2, a second embodiment of the invention is seen wherein the reaction vessel 16 is provided with side arm 18 formed integrally with the reaction vessel 16 at a predetermined angle and at a predetermined distance from the lower end of the reaction vessel. The distance and angle should be such as to allow the feeding of a rod 20 into the molten metal 6' at the middle of the base of the reaction vessel. As FIGURE 1, the feeding elements for the rod comprise oppositely rotating rollers 2, 2' schematically illustrated. While this form of the invention permits the addition of the foaming elements to the base of the bath, and also feeds only the base of the rod to the molten metal, it also reduces the hazard of fire caused by too rapid melting of the rod. However, some difficulty may be encountered by molten metal backing into the side arm if the rod feed is withdrawn or if the rod is not continuous.

Figure 3:
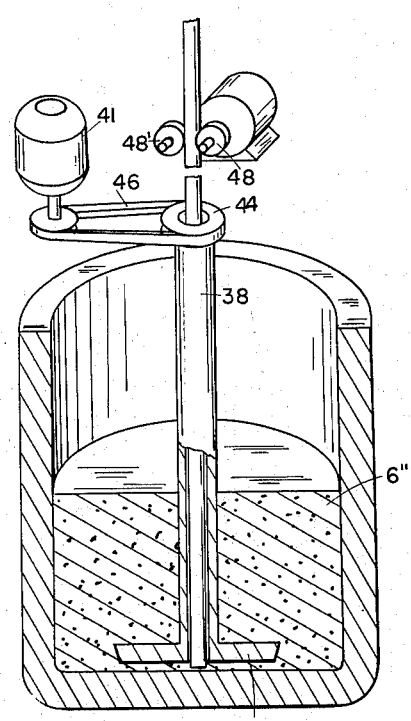
FIGURE 3 is a vertical cross-sectional view of a third embodiment for introducing a rod according to the invention into intimate reactant relationship with a molten metal.

As shown in FIGURE 3, a third embodiment of the invention is shown, wherein a beater tube 38 is utilized as a protection of the main body of the rod from direct exposure to the molten metal 6''. Beater tube 38 has beater blade 40 attached at the lower end thereof and is rotatably mounted in bearings to provide for rotation on a vertical axis which may be accomplished through driving means 41 for rotating the beater during introduction of the rod operating through belt 46 and pulley 44 coaxially secured to tube 38.

The means for feeding the rod is not critical so long as a steady rate of feed is obtained; for example rollers 48 and 48' may be used.

Shown in FIGURES 4, 5, 6, 7, 8, 9, 10 and 11 are different embodiments of the rod designed for introducing the foaming mixture into the molten metal matrix.

Figure 4:
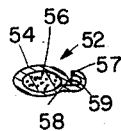
FIGURE 4 is a cross-sectional view of one embodiment of a rod of the invention.

Referring now to FIGURE 4, a rod 52 is made of a metal strip 54 folded around a predetermined amount of hydride-containing metal powder 56 and folded lengthwise so that the edges of said strip meet. The edges 57 and 58 of metal strip 54 are joined by pressing said edges together at 59 and doubling said edges 57 and 58 over and pressing to completely seal the mixture therein. The ends of said rod may be sealed by pressing and shearing.

Figure 5:
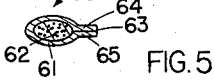
FIGURE 5 is a cross-sectional view of another embodiment of a rod of the invention.

Referring now to FIGURE 5, a rod 60 is made of a metal strip 61 folded lengthwise so that a predetermined amount of hydride-containing metal powder 62 can be contained therein. The two edges 64 and 65 of the metal strip should meet on folding and can be pressed and sheared at 63 in such a way as to completely seal the mixture therein. The ends of said rod may be sealed by pressing and shearing.

Figure 6:
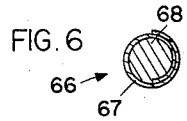
FIGURE 6 is a cross-sectional view of still another embodiment of a rod of the invention.

Referring now to FIGURE 6, a rod 66 is made by rolling a metal strip 67 tightly around a solid metallic body of hydride-containing metal alloy 68 to completely enclose the metallic body 68.

Figure 7:
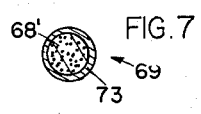
FIGURE 7 is a cross-sectional view of still another embodiment of a rod of the invention.
Figure 8:
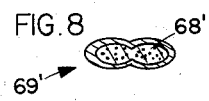
FIGURE 8 is a cross-sectional view of an embodiment of a rod of the invention.

Referring now to FIGURE 7, a cylindrical rod 69 is made by filling a metal tube 73 with a hydride-containing metal powder 68'; the ends of the rod (not shown) being sheared so that no powder can escape. FIGURE 8 shows the same rod 69' as FIGURE 7 except the rod has been flattened after formation in order to pack the powder 68' and more adequately retain it in place.

Figure 9:
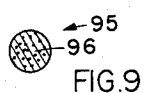
FIGURE 9 is a cross-sectional view of an embodiment of a rod of the invention.

Referring now to FIGURE 9, a rod 95 is made by molding a solid metallic body of hydride-containing metal alloy 96.

Figure 10:
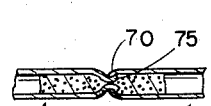
FIGURE 10 is a cross-sectional view of an embodiment of a rod of the invention.

Referring now to FIGURE 10, two rods 71 and 72 similar to FIGURE 7 are joined at point of juncture 70 and said rods are crimped. The juncture comprises partially flattening end 75 of rod 71, slipping said end 75 into rod 72 and flattening the end of rod 72 over the end of rod 71 to tightly join the two rods. The crimp 79 is made at equal intervals along said rods to evenly distribute and retain in place the foaming mixture therein.

Figure 11:
FIGURE 11 is a cross-sectional view of an embodiment of a rod of the invention.

Referring now to FIGURE 11, two rods 81 and 82 of the same material and structure as FIGURE 7 and which have both ends of each rod flattened and sheared, are joined by taking flattened and sheared ends 84 and 86 of rods 81 and 82 respectively, placing the rods 81 and 82 so that the end of rod 81 sufficiently overlaps the end of rod 82 and riveting with a rivet 87 to join the ends of rod 81 and 82 together. The rods 81 and 82 after riveting are preferably in the same plane and the resultant rod is preferably relatively straight.

Referring now to FIGURE 12, the apparatus for introducing gas according to the invention into uniform cell-forming relationship with the molten metal to be foamed is given the general designation 88. The apparatus consists of a gas head 89 attached to a hollow tube 90 which is attached to a beater head 91. The gas head consists of a gland and packing, and allows an introduction of gas in hollow tube 90. The beater head 91 attached to hollow tube 90 is equipped with a plurality of small holes 94 and may be caused to rotate by any suitable means such as motor 97 as shown, which may drive the rod through belt 98 passing over pulley 99. The beater should be operated close to the bottom of the reaction vessel. The gas travels at some predetermined pressure through the gas head down the hollow tube 90 and is expelled into the molten metal through the plurality of holes 94 in the base of the beater head 91. Holes for dispersion of the gas may, if preferred be located alternate with or additionally at the top of the beater head or at the base of the hollow tube.

Referring to FIGURE 13, there is shown an example of a suitable alloy wherein aluminum and magnesium are utilized in proportions of 78%–93% aluminum to 22%–7% magnesium, the solid and liquid phase temperature of the alloy thus formed being in the neighborhood of from 450° C. solid and 540° C. liquid for the 78% aluminum mix to 550° C. solid and 630° C. liquid for the 93% aluminum mix.

Referring now to FIGURE 14, an apparatus for continuously producing metal foam is given the general designation 100 and comprises a furnace for melting the metal to be foamed, a crucible in which foaming takes place, a rod by which the foaming agent is introduced, a conveyor belt used for carrying the molten metal foam through a heating zone to further expand the discrete cellular bubbles and a cooling zone to set the foam. Molten metal 101 is continuously poured from a furnace 102 (schematically illustrated) through nozzle 103 into crucible 104. The rod 105 comprising metal tube and hydride-containing metal powder is continuously advanced by means described in FIGURE 1 into a pool of molten metal formed by said metal in said crucible 104. The molten metal is continuously agitated by beater 92. The metal upon foaming continuously flows from crucible 104 onto conveyor belt 106. The conveyor belt which is slightly concave to prevent the molten metal foam from flowing off the sides of said belt, continuously draws the molten metal foam through a heating zone 107 to which heat is supplied by means of gas burners (not shown) and then through a cooling zone which in this case comprises a spray formed by water faucets 108 and 109.

Referring now to FIGURE 15, an apparatus for continuously producing metal foam is designated generally as 110 and comprises a furnace for melting the metal foam, a crucible in which foaming takes place, a hollow beater rod having small holes near the base for introducing the gas into the molten metal to form foamed metal and a conveyor belt for carrying the molten metal foam from the crucible and allowing it to set by gradually cooling, thus forming a continuous elongated member. Molten metal 101' is continuously poured from furnace 102' (schematically illustrated) through nozzle 103' into crucible 104' which is continuously heated by gas burner (not shown) to keep the metal in the molten state. The molten metal as it forms a pool in said crucible continuously has a gas 111 such as oxygen introduced therein, preferably near the base of said crucible, the gas is introduced into the molten metal by the apparatus of FIGURE 12. The gas flows down hollow beater rod 112, through tiny holes 113 near or at the base of said rod 112 while the beater continuously rotates by means described in FIGURE 12. Beater blades 114 tend to shear the bubbles into smaller bubbles. The gas foams the metal and as it is foamed it continuously flows onto conveyor belt 106' where it is cooled by water faucets 108' and 109'.

In FIGURES 16 through 20 the various steps for a batch process for producing metal foam are given.

Referring now to FIGURE 16, an apparatus designated generally as 115 for producing metal foam 119 in batch amounts comprises pouring molten aluminum 101" from furnace 102" schematically illustrated into crucible 120 which is heated by means of gas burners 118 and 118' and then subjecting said molten aluminum simultaneously to the action of a beater 117 and a rod 116 comprising a metal tube and a hydride-containing metal alloy; said rod being introduced manually. The beater comprises beater blades 121, beater rod 122 and means for driving said beater 123. The temperature of said aluminum is maintained between 700° C.–800° C.

Referring now to FIGURE 17, the crucible 120 containing partially foamed molten metal 119 is poured into mold 124 to partially fill said mold.

Referring now to FIGURE 18, the mold 124 containing the partially foamed molten metal 119 is shown.

Referring now to FIGURE 19, the mold 124 containing partially foamed molten metal 119 is subjected to additional heating by means of gas burners 125, 125', 125" above the mold directed on said metal foam and gas burners 126, 126', 126", 126''' directed on the bottom of the mold to cause additional expansion of the cells formed therewithin.

Referring now to FIGURE 20 the mold 124 and metal foam 119 are subjected to air cooling by means of fan 127 directed thereon.

The invention is adapted to foam any metal capable of being foamed. Metals which may be used include preferably aluminum, zinc, iron, lead, copper and nickel as well as alloys of these and other metals and such metals as magnesium and titanium may be suitable.

The metals preferred for the invention include those having a substantial temperature difference, preferably of 200° to 400° C., between the solid phase temperature and the liquid phase temperature as shown in phase diagrams. However, a wide temperature difference is not always necessary. For example, aluminum of nearly 100% purity and having slight if any temperature difference between solid phases may be foamed with good results at about 750° C. or in the range of from about 700° C. to 800° C. At temperatures below 700° C., the metal is too nearly entirely solid and inferior foam is produced at temperatures above 800° C. In order to obtain a superior product it is also helpful to utilize metal wherein its solid phase may be caused to predominate to cause decreased fluidity; the metal being foamed at the temperature at which this occurs, such temperature being between the solid and liquid phase temperatures.

The metal is prepared for foaming by first melting the metal in a suitable furnace. The molten metal is then introduced into a heated vessel where the gas or foaming agent is added.

For foaming the metal, the addition of a foaming agent such as a hydride-containing metal alloy or powder or a gas such as oxygen is necessary. The metal hydrides preferred for forming the hydride-containing metal alloy or powder are zirconium hydride and titanium hydride.

In addition to metal hydrides and gas, I may also use other compounds under certain temperature and pressure conditions such as ammonium chloride, ammonium iodide, ammonium sulfate, arsenic, barium hydride, bismuth sulfate, calcium carbonate, calcium hydride, calcium magnesium carbonate, calcium sulfite, ferric sulfate, lead carbonate, lead oxide, rhodium chloride, rubidium hydride, sodium nitrate.

The metal hydride is used in the form of a hydride-containing metal alloy or powder and is added to the metal to be foamed in the form of a rod.

The method employing the rod feed gives a superior foam and is especially suited where a metal foam of high purity is not needed. A slightly adulterated product is obtained with this rod due to the deposition of metal from the metal hydride after the release of its hydrogen.

The rod may be a solid rod of material adapted to cause foaming of the metal or may comprise a core of a material adapted to effect foaming of a metal contained in a metal tube. Such a core of the rod may consist of discrete particles of hydride-containing metal alloy or powder or may be a solid metallic body. Such particles of hydride-containing metal alloy or powder may be rammed into the metal tube, poured into the metal tube or the alloy or powder may be placed along a metal strip and the metal strip then rolled or folded so as to completely seal the hydride-containing metal alloy or powder therein as mentioned above in connection with the figures.

The metal alloy or powder contained in the hydride-containing metal alloy or powder should consist of particles of a metal alloyable with the hydride and alloyable with the metal adapted to be foamed by the hydride or should consist of particles of a metal substantially identical with metal to be foamed, or should consist of a metal alloyable with the metal to be foamed.

The tube of the rod may be formed of the same metal as that metal which is to be foamed, or may be made of a metal alloyable with the metal to be foamed. As mentioned above, it is also possible to omit the tube of the rod in cases where the core can be made of a solid metallic body, e.g., a rod of hydride-containing metal alloy or other foaming agent alone.

The tube may be made of any shape which can be conveniently fed to the molten metal. A cylindrical tube may be filled with hydride-containing metal alloy or powder and used in this form or the tube after filling may be flattened or crimped or both. It is also possible to roll a predetermined amount of hydride-containing metal alloy or powder in a piece of metal stripping as shown in FIGURE 6 or to fold a piece of metal strip containing a foaming mixture thereinbetween and to shear the open edge of said metal strip to seal the mixture therein or the open edge may be folded over as shown in FIGURE 4 to seal the mixture therein. It is preferred that the finished rod be crimped so that the hydride-containing metal alloy is uniformly distributed in the tube. In order to have a continuous rod feed, the tubes may be joined by rivets or other suitable joining means.

The diameter of the rod is dependent on the feed rate of the rod, the amount of hydride used in the rod and the desired density of the foamed metal.

The rod of the rod feed apparatus should be of a size and shape which does not permit too rapid melting of the rod. If the rod size is such that melting occurs immediately, the rod melts at the surface and there may be combustion at the surface of the metal matrix of such foaming agent as hydride-containing powder. I may also in some instances use more than one rod by employing rods of smaller diameter and containing less foaming mixture than might otherwise be used.

The rod either consisting of the hydride-containing metal alloy or powder is introduced to a feeding mechanism which plunges the rod into the metal to be foamed. The rod is then submerged in the molten metal and the rod shell or rod melts to discharge the metal hydride into the metal matrix. The rod is continuously fed into the molten metal until sufficient hydride has been added to produce foam of the desired density.

In forming the hydride-containing metal alloy or powder, it has been found that the amount of metal hydride used varies with the metal hydride used. For example, the preferred ratios when zirconium hydride is used for foaming aluminum are 5–25% by weight zirconium hydride with 95–75% aluminum powder, however, when titanium hydride is used, 2.5–13% titanium hydride with 97.5–87% aluminum powder is used.

The metal foam may be produced continuously or in a batch process when the rod feed method is employed. For the batch process, the metal is first heated in a furnace or vessel until the metal is melted and is at a temperature desirable for foaming. The metal is then poured into a heated vessel in which foaming is to take place. A rod consisting of a metal tube filled with a hydride-containing metal powder composed of metal hydride and metal alloyable with the metal to be foamed or the same metal as is to be foamed is fed into the molten metal until sufficient hydride has been added to produce foam of the desired density. The rod is then withdrawn and the molten partially foamed metal is withdrawn from the foaming vessel. The foam is immediately exposed to additional heat which causes additional expansion of the cells formed therewithin. The foamed metal may then be cooled by quenching with water, oil or air or other gas. The additional heating may be obtained by gas or oil burners directed on the molten metal foam or other suitable means.

In a continuous process I may continuously pour molten metal from a melting furnace into a heated silicon carbide vessel or other vessel suitable for the purpose. A rod of suitable design containing foaming agent is continuously fed into a pool of the molten metal in the vessel wherein the foaming agent is thoroughly mixed with the metal by stirring or other suitable means, the vessel being so designed that the molten metal, as it begins to foam *or prior to formation of any substantial amount of foam* continuously flows out of the vessel whereupon it may pass on to a conveyor belt. The conveyor belt carries the molten metal as it foams through a heated zone wherein most of the foaming action takes place in a manner remotely analogous to some degree to "baking" and then is quenched preferably by air or cold water. The foamed metal having discrete cellular bubbles is continuously withdrawn from the conveyor belt and may be sawed into suitable lengths, if desired, by well known means.

If the method employing hydride-containing metal alloy or powder is not desirable due to the slightly adulterated product obtained, a gas can be utilized for foaming to produce a rather pure metal foam. Using a gas, the composition of the material to be foamed may not be changed or may be changed in a different manner and the cost of producing the foam is much less; the latter reason being very favorable to large scale production.

Gases which may be utilized include carbon dioxide, hydrogen, argon, nitrogen, compressed air, oxygen and steam although oxygen and steam are preferred.

The metal may be melted in a suitable furnace and a stream of molten metal may be caused to flow from the furnace, for example by tilting of the furnace. The stream may be caused to flow into a reaction vessel which is heated to keep the metal in the liquid state. If gas is to be used for foaming, a hollow beater rod having perforations at the end of the rod, slightly below the beater or slightly above the beater as shown in FIGURE 15 may be used for introducing the gas. It is preferred that there be at least four such perforations or holes in order to provide a plurality of smaller streams of gas to produce a larger number of smaller bubbles than would result from a lesser number of larger streams. The beater is continually operated by rotating the rod with the beater head being maintained below the surface of the molten metal pool and near the base thereof to provide a continuously varying point of introduction of said gas. As cellular bubbles are formed, the liquid foamed metal is continuously withdrawn and continuously cooled with a quenching bath of air or cold water or other suitable means.

It is preferred that there by agitation of the pool or the introducing means or both so that the large bubbles after their formation are sheared into smaller cells by the beater blades or by other suitable means. For example the gas may be introduced through a tube having its lower end agitated transversely or circularly or both beneath the surface of the pool. The metal to be foamed and gas may combine to provide surfaces on the obtained cells of a resultant reaction product to prevent coalescence of the bubbles formed. For example, oxygen may be introduced into aluminum with resultant formation of aluminum oxide, a high melting rigid solid, in the interior walls of the bubbles, which may tend to aid in preventing collapse thereof.

In some cases it may be preferable to provide more than one source of gas in the molten metal bath. For example, two or three lances or beaters may be provided in various parts of the vessel. When more than one source of gas is used, it is still preferable to agitate the pool or the sources or both so that small discrete cells are obtained.

The metal to be foamed should have a liquid phase temperature at least 100° C. higher than its solid phase temperature and the molten metal's temperature should be maintained at a temperature between the liquid phase temperature and the solid phase temperature to reduce the fluidity of the molten metal to assist foaming.

The amount of gas utilized for foaming depends on the metal used, the density of the desired foam and the gas used.

Having thus disclosed my invention, I claim:

1. The method of making a metal foam body comprising the steps of providing a pool of molten metal having an unconfined surface determined by gravity connecting with a gas-filled space above said pool, intensively mixing said pool so that said molten metal is in rapid rotative movement, advancing downwardly through said gravity-determined surface into said rapidly moving molten metal from said space above and connecting with said pool an elongated meltable metal member comprising a substance which liberates gas when heated to the temperature of said molten metal to introduce said substance downwardly into said molten metal in accordance with the advance of said member, intensively mixing said substance and said rapidly moving molten metal to provide a rapidly rotatively moving mixture of said substance and said molten metal, thereby to provide molten metal foam containing discrete cellular bubbles distributed therethrough, withdrawing a quantity of said mixture from said pool, then heating said quantity of said mixture to cause cells therewithin to expand in size, and cooling said molten metal foam.

2. The process of claim 1 wherein said mixture is withdrawn prior to formation of any substantial amount of foam.

3. The method of claim 1 wherein said pool of molten metal has a liquid phase temperature at least 100° C. higher than its solid phase temperature and said pool is maintained at a temperature between said liquid phase temperature and said solid phase temperature to provide substantially reduced fluidity of said metal.

4. The method for continuously making a continuous elongated metal foam body comprising the steps of providing a flowing quantity of molten metal, causing said flowing quantity of molten metal to continuously flow into a pool of said molten metal having an unconfined surface determined by gravity connecting with a gas-filled space above said pool, continuously intensively mixing said pool so that said molten metal in said pool is in rapid rotative motion, continuously advancing downwardly through said gravity-determined surface into said pool from said space above and connecting with said pool an elongated meltable metal member comprising a substance which liberates gas when heated to the temperature of said molten metal to introduce said substance downwardly into said pool in accordance with the advance of said member, continuously intensively mixing said substance and said rapidly moving molten metal to continuously provide a mixture of said substance and said molten metal, continuously withdrawing from said pool a quantity of said mixture to thereby continuously provide a quantity of continuous elongated molten metal foam containing discrete cellular bubbles distributed therethrough, then continuously heating said continuously withdrawn quantity of said mixture to cause cells therewithin to expand in size, and continuously cooling said body.

5. The process of claim 4 wherein said mixture is withdrawn prior to formation of any substantial amount of foam.

6. The method of claim 4 wherein said pool of molten metal has a liquid phase temperature at least 100° C. higher than its solid phase temperature and said pool is maintained at a temperature between said liquid phase temperature and said solid phase temperature to provide substantially reduced fluidity of said metal.

7. The method of making a foamed metal body comprising the steps of providing a molten pool of metal, advancing an elongated meltable metal body enclosing a material adapted to effect foaming of said metal therewithin forward and into said pool to introduce foaming agent thereinto in accordance with the advance of said rod to thereby form a body of molten metal containing discrete cellular bubbles distributed therethrough, withdrawing said molten metal containing discrete cellular bubbles distributed therethrough from said pool, then heating said body to cause said cells therewithin to expand in size, and cooling said body.

8. The method of claim 7 wherein said molten pool of metal has a liquid phase temperature at least 100° C. higher than its solid phase temperature and said pool is maintained at a temperature between said liquid phase temperature and said solid phase temperature to provide substantially reduced fluidity of said metal.

9. The method for continuously making a continuous elongated member of metal foam comprising the steps of providing a stream of molten metal, causing said stream of molten metal to continuously flow into a molten pool of said metal, continuously advancing an elongated meltable metal body enclosing a material adapted to effect foaming of said metal therewithin forward and into said pool to introduce foaming agent thereinto in accordance with the advance of said metal body and continuously withdrawing from said pool a stream of said molten metal provided with said cellular bubbles therewithin having the form of liquid foam, continuously withdrawing said molten metal from said pool, then causing said continuous stream to be exposed to heat to cause the cells therewithin to expand in size, and continuously cooling said body.

10. The method of claim 9 wherein said molten pool of metal has a liquid phase temperature at least 100° C. higher than its solid phase temperature and said pool is maintained at a temperature between said liquid phase temperature and said solid phase temperature to provide substantially reduced fluidity of said metal.

11. A method of making a foamed metal body comprising the steps of providing a molten pool of metal, advancing an elongated meltable metal body containing a material adapted to effect foaming of said molten pool of metal therewithin said meltable metal body having a liquid phase temperature at least 100° C. higher than its solid phase temperature and comprising a tube of the same metal as the metal being formed, forward into said pool to introduce foaming agent thereinto in accordance with the advance of said meltable body to form thereby a body of molten metal containing discrete cellular bubbles distributed therethrough then cooling said body to provide a metal foam, said metal being foamed having a liquid phase temperature at least 100° C. higher than its solid phase temperature and said pool being maintained at a temperature between said liquid phase temperature and said solid phase temperature to provide substantially reduced fluidity of said metal.

References Cited by the Examiner

UNITED STATES PATENTS

| | | | |
|---|---|---|---|
| 2,397,418 | 3/46 | Howard | 75—93 |
| 2,751,289 | 6/56 | Elliott | 75—20 |

FOREIGN PATENTS

| | | |
|---|---|---|
| 493,231 | 5/50 | Belgium. |
| 699,667 | 11/53 | Great Britain. |

BENJAMIN HENKIN, *Primary Examiner.*